Patented Apr. 9, 1935

1,996,985

UNITED STATES PATENT OFFICE 1,996,985

PROCESS FOR PARTING RESIDUES, SWEEPINGS, AND THE LIKE CONTAINING PRECIOUS METALS

Wilhelm Truthe, Frankfort-on-the-Main, Germany

No Drawing. Application May 4, 1932, Serial No. 609,338. In Germany May 4, 1931

7 Claims. (Cl. 204—57)

My invention relates to a process for parting goldsmith's scrapings, sweepings, sludges, residues and the like which, in addition to precious metals such as silver, gold and metals of the platinum group, contain base metals such as copper, nickel, zinc and the like.

Hitherto, when residues containing copper have been parted, it has been usual to heat the material in an oxidizing atmosphere with lead, whereby in addition to scum or dross respectively, which are rich in precious metals, a litharge rich in copper, which contained in addition precious metals, was obtained. To work up this material and gain the copper metal is only possible in a long and troublesome process of concentration and refining, whilst the precious metals are chiefly concentrated in the "blick". From this "blick" the various precious metals are either obtained by electrolysis or by separation by means of acids.

According to my invention the material to be separated, for instance scrapings, sweepings, residues or the like, which contains copper and may further contain base metals such as nickel, zinc and the like, is subjected directly to electrolysis in an electrolyte which is either faintly acid, neutral or slightly alkaline, and contains salts of nitric acid. The electrolysis is carried out without a diaphragm. By this electrolysis a sludge is obtained at the cathode which mainly consists of metallic silver and copper and further of basic copper compounds. The other base metals are either dissolved in the electrolyte or remain undissolved and form a sludge which is deposited at the anodes, whilst the electrolyte itself is substantially free from silver. The sludge from the cathodes is worked up into pure silver by leaching it with diluted sulphuric acid.

I found it advantageous to subject the cathodic sludge, before it is leached, to heat in the presence of oxygen and thus oxidize it as far as possible. The sulphuric acid solution contains copper sulphate and is substantially free from precious metals, above all silver. From the solution the metallic copper is obtained in the well known way, for instance, by cementation, for example with metallic iron, or by electrolysis with the aid of insoluble anodes, or the solution is evaporated and worked into copper sulphate by crystallization. The oxidizing heating process is carried out to advantage in a suitable roasting furnace, such as a muffle, a flame furnace or the like.

At the anode generally the sludge is found to adhere firmly. The anodic sludge may be removed by scraping or it may be collected in bags which are hung up surrounding the anodes. These anode sludges contain in addition to the total gold and platinum metals, still certain quantities of silver and some base metals. The anodic sludges are treated by extracting them with nitric acid or sulphuric acid at an elevated temperature, whereby a residue is gained which is nearly free from silver and copper. The parting of the residue, comprising mainly a high-grade crude gold, may be carried out in any of the well-known ways, for instance according to the so-called Wohlwill process.

For electrolyzing the material to be treated, i. e. scrapings, sweepings and the like, I take for instance a solution of copper nitrate which is faintly acidified by nitric acid, or of alkali metal or alkaline earth metal nitrate or a mixture respectively of these nitrates. Instead of acidifying this solution, I have also worked with neutral solutions or with solutions which have been made faintly alkaline by the addition of, for instance, ammonium nitrate. Generally I have kept the concentration of these salts within such limits that the leaching liquor contained for instance 40–80 g. copper (or expressed in copper nitrate $Cu(NO_3)_2.3aq$, 152 to 304 g. respectively) or 20–50 g. copper and 30–50 g. nitre in 1000 ccs.

The current density is according to my invention adapted to the content of precious metals in the material to be separated. I proceed in this respect by taking for instance, if the material to be separated is rich in precious metals, a current density of about 350 amperes per sq. metre at the anode. If the material to be separated is poor in precious metals, a higher current density is employed, for instances 1,000–1,500 amperes per sq. metre.

The method of procedure of my invention may be seen from the following examples, but I do not want to be restricted to the figures given therein, as all quantities and the other figures may vary, but the conditions for most favourably carrying out my process may easily be ascertained by trial, following up the general directions in this application.

*Example I.*—Scrapings, sweepings or residues which contain 782 parts silver, 61.2 gold, .28 platinum and .2 palladium as precious ingredients in 1000, and in addition 140 parts copper, 4 lead, 4 zinc, 0.5 tin, 1.5 nickel and 0.3 iron are fused and cast into a slab. This slab is suspended as anode in a solution which contains 40 g. of copper in the form of nitrate or 152 g. of crystallized copper nitrate and 40 g. of sodium nitrate in 1000 ccs. The current density is kept at about 350 amperes per sq. metre at the anode. The sludge formed at the anode and deposited there is already considerably richer in gold and platinum metals. After it has been extracted by boiling with nitric acid, a crude gold is obtained which contains 967 parts in 1000 gold and only a little silver. The sludge formed at the cathode on the other hand contains, after it has been washed and leached with cold diluted sulphuric acid, 772 parts silver in 1000 parts. After the cathodic sludge has been heated to a red heat in the presence of oxygen and has been leached with diluted sulphuric acid, its content of silver is at least 980 parts in 1000.

Example II.—A material which is rich in copper is treated as described in Example I by suspending it in the form of slabs as anode in a bath which has a similar composition to the electrolyte described in Example I. The electrolysis is effected with a current density of 1200–1500 amperes per sq. metre at the anode, using advantageously copper sheets, sheets of non-corrosive steel such as are generally known under the trade name of "V2A" and the like as cathodes. The sludges formed at the anodes and the spongy deposits separated at the anodes are treated in a manner similar to that described in Example I.

The separation of scrapings, sweepings, residues or the like containing precious metals according to the present invention allows of obtaining pure metals by few and simple manipulations. Its chief advantage is that the various precious metals are not divided up and distributed amongst the various solutions and deposits obtained as intermediate steps of those processes which have hitherto been in use, proceeding either on dry or on wet lines, and it thereby avoids loss of capital interest which is caused by the precious metals being fixed and held in the various steps and cannot be got out for a long time.

By materials rich in copper or poor in precious metals respectively I mean such as contain 80 percent and more of copper, whilst the precious metal content is 20 percent or less. By materials rich in precious metals, on the other hand, such are meant as contain 20 percent and more of precious metals.

What I claim is:

1. A process of separating mixtures containing copper and precious metals, such as the metals present in goldsmith's sweepings and similar metal mixtures, which consists in forming the mixed metals into slabs and subjecting them to electrolysis, said slabs forming the anodes, in an electrolyte which contains nitrates in aqueous solution, said electrolyte varying but slightly from a condition of neutrality as regards its condition of alkalinity or acidity, and being substantially free from dissolved silver, said electrolyzing current being of such value that a high current density is obtained, thus precipitating only copper and silver at the cathode in the form of a sludge, removing said mixture of copper and silver from the electrolyte, treating said mixture with dilute sulphuric acid for the purpose of dissolving the copper, the silver remaining undissolved, regaining the copper from the solution by any suitable process, removing from the electrolyte the sludge formed at the anodes, and treating said anodic sludge with a mineral acid to obtain metallic gold.

2. In a process for separating mixtures of metals containing copper and precious metals, such as those metallic mixtures found in goldsmith's scrapings, the steps which consist in forming a slab from the metal mixture, subjecting said slab to electrolysis as an anode in an electrolyte containing copper nitrate in aqueous solution, said electrolyte being substantially free from dissolved silver, removing from the bath the sludge of silver and copper formed at the cathode and treating it with dilute sulphuric acid, the silver remaining undissolved, while the copper goes into solution, regaining the copper from the solution by any well known process, removing the sludge formed at the anodes, and then treating it with a mineral acid for the separation of the gold from said anodic sludge.

3. A process of separating mixtures of metals which contain copper, precious metals such as gold and silver as well as other less valuable metals, which consists in forming the mixture of materials into a slab and subjecting it to electrolysis as the anode in an electrolyte which contains an alkali metal nitrate in aqueous solution in a concentration of 30 to 50 grams per liter, the said current density being maintained relatively high, precipitating at the cathode a sludge containing solely copper and silver, extracting said copper-silver mixture from the electrolyte and treating it with dilute sulphuric acid for the purpose of dissolving the copper, the silver remaining undissolved, regaining the copper from the solution by any suitable process, removing from the electrolyte the sludge formed at the anodes and treating said anodic sludge with a mineral acid for the purpose of recovering pure gold.

4. A process of separating mixtures of metals which contain copper, precious metals such as gold and silver, and other baser metals, which consists in forming the mixture of metals into a slab, subjecting said mixture to electrolysis as the anode in an electrolyte which is substantially free from dissolved silver and contains alkaline earth metal nitrates in aqueous solution, said current density being maintained at a relatively high rate, precipitating a sludge containing copper and silver at the cathode, removing said deposit from the electrolyte and subjecting it to the action of dilute sulphuric acid, the copper therein going into solution, while the silver remains undissolved, regaining the copper from said solution by any suitable process, removing from the electrolyte the sludge which is formed at the anodes, and treating said anodic sludge with a mineral acid for the purpose of regaining pure gold.

5. A process for separating a mixture of metals which contains copper, precious metals such as gold, silver and platinum metals, and baser metals, which consists in forming said metal mixture into a slab and subjecting it to electrolysis as the anode in an electrolyte which is substantially free from dissolved silver and contains a mixture of nitrates in aqueous solution, said current density being relatively high and ranging from 350 amperes to 1,500 amperes per square meter of anode surface, precipitating at the cathode a sludge of silver and copper, removing said precipitate from the electrolyte and subjecting it to the action of dilute sulphuric acid for the purpose of dissolving the copper, the silver component of the mixture remaining undissolved, regaining the copper from the solution by any suitable method, removing from the bath the sludge which is formed at the anodes, and treating said anodic sludge with a mineral acid for the purpose of recovering the gold.

6. A process of separating a mixture of metals containing copper, precious metals, and baser metals, which consists in forming said mixture of metals into slabs and subjecting them to electrolysis as the anodes in an electrolyte containing nitrates in an aqueous solution which is but slightly acidified and is substantially free from dissolved silver, said current density being maintained at a substantially high value, precipitating a sludge of copper and silver at the cathode, removing said deposit from the electrolyte and subjecting it to the action of dilute sulphuric acid for the purpose of dissolving the copper while the silver remains undissolved, regaining the copper from the solution by any well known and suitable method, extracting from the electrolyte the sludge formed at the anodes and treating said sludge with a mineral acid such as nitric acid for the purpose of recovering the gold.

7. In a process of separating a mixture of metals, which contains copper in addition to precious metals such as goldsmith's sweepings, scrapings or residues, the steps which consist of forming a metal mixture into slabs and subjecting it to electrolysis as the anodes in an electrolyte which is substantially free from dissolved silver and contains nitrates in aqueous solution, said electrolyte being made slightly acid by the addition of nitric acid, at a current density which ranges from 350 to 1,500 amperes per square meter of anode surface, precipitating at the cathode a sludge of silver and copper, removing said precipitate from the electrolyte, and subjecting it to the action of dilute sulphuric acid for the purpose of dissolving the copper while the silver remains undissolved, regaining the copper from the solution by any suitable process, removing from the electrolyte the sludge formed at the anodes and treating said anodic sludge with a mineral acid, pure gold being recovered from the undissolved residue.

WILHELM TRUTHE.